Dec. 12, 1944.   H. H. PRATLEY   2,364,655
GEOPHYSICAL EXPLORATION
Filed Dec. 24, 1940   2 Sheets-Sheet 1

INVENTOR
Henry Hart Pratley
BY John Flann
ATTORNEY.

Dec. 12, 1944.                H. H. PRATLEY                    2,364,655
                         GEOPHYSICAL EXPLORATION
                           Filed Dec. 24, 1940         2 Sheets-Sheet 2
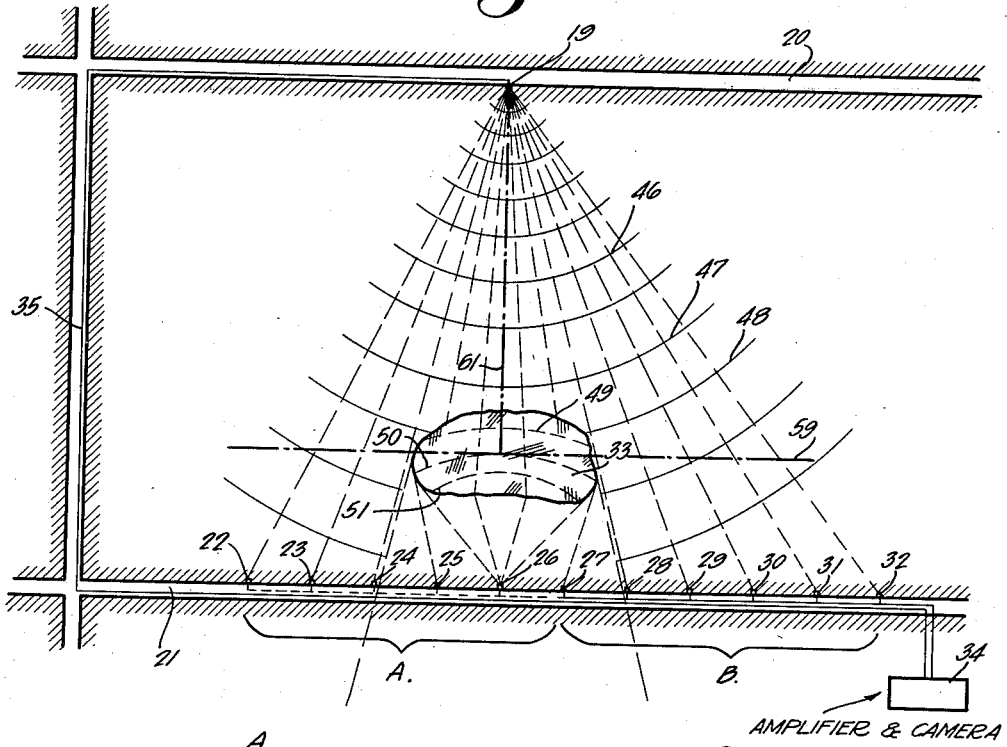
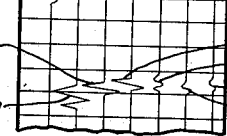
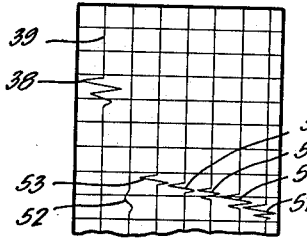
INVENTOR
Henry Hart Pratley
BY John Flanu
ATTORNEY Patented Dec. 12, 1944

2,364,655

UNITED STATES PATENT OFFICE 2,364,655

GEOPHYSICAL EXPLORATION

Henry Hart Pratley, Glendale, Calif.; California Trust Company executor of said Henry Hart Pratley, deceased Application December 24, 1940, Serial No. 371,470

7 Claims. (Cl. 181—0.5)

This invention relates to a geophysical method of prospecting. More specifically, this invention relates to a seismic method for locating and delineating mineral deposits.

The principal and most direct method of locating ore bodies consists in driving prospecting or development headings more or less systematically in the region under investigation, also boring diamond drill holes or churn holes and recovering samples from headings and drill holes for assays to determine mineral values. These methods are expensive, laborious, slow and of limited scope.

In many mineral provinces, the original ore discoveries were made at the outcroppings and these have been followed along strike and dip to the exhaustion of the ore or else the ore have become so attenuated as to be unprofitable of mining. Other ore bodies may exist in the mineral province, separate, distinct and apart from the original discoveries. In some type of deposits, irregular ore masses, known as chimneys, lenses, or fissures may lie within definite channels or horizons but their locations within these limits are often random-like, without apparent breaks or stringers leading to them. This invention is particularly useful in discovering and delineating such deposits.

It is well known that many valuable ore deposits have characteristic seismic wave velocities which are low compared to the seismic wave velocities in the surrounding country rocks. The greater this contrast between the velocities in the ores and in the country rock, the better is the resolving power obtained by the aid of this invention. For example, dry siliceous ores carrying values in gold, silver, and which may also have some values in the base metals, such as copper, lead and zinc, may consist in a "vuggy," porous "sugary" matrix. Such a rock mass will have a characteristically low elasticity value and a correspondingly low seismic or sound wave velocity. It is similarly true that an ore composed mostly of values in the base metals, such as heavy lead sulphides have a higher density than the enclosing country rocks and hence have a distinct velocity relationship with respect to the county rock. It has been found that such ore masses can be readily and accurately located.

Use may be made of these velocity characteristics for this purpose. Thus elastic waves may be propagated adjacent one side of the terrain to be explored; and the arrival of the waves may be noted on the opposite side of the terrain at a plurality of scattered points. This may be accomplished by positioning an explosive charge adjacent a level or shaft, or drift or raise in a mine, and a plurality of receptors adjacent another level or shaft or drift or raise; then detonating the charge and recording the wave arrivals at the receptors. Any abrupt irregularities or departures from uniformity in the time intervals or sharpness of the received impulses are indicative of an anomalous velocity section in the path of the waves, and from this may be deduced that such an anomalous velocity section may be due to an ore body in the region under investigation. This effect of irregularity may be aptly termed one that is due to the "shadow" of the body. By changing the relative positions of the charge and the receptors in connection with additional detonations, the location of the body may be quite well indicated.

This method accordingly involves placing the shot point on one side, above, below, over, under or between the areas under investigation and placing the recording instruments on the opposite side from the shot point, above, below, over, under or between the area under investigation so as to record the seismological characteristics of the area which lies within the boundaries or areal lines directly joining the shot point with the receptors, and thereby mapping the "shadow zone" effect caused by a mineral deposit lying within the areal boundaries and by analysis of the wave front time arrivals and wave front intensities determine the position of an ore body.

Accordingly, an object of this invention is to provide a novel geophysical method for locating ore bodies in a mineral province.

Another object of my invention is to provide a simple seismic method for locating low velocity ore bodies which exist in a high velocity country rock.

Another object of my invention is to provide a geophysical method for delineating the size and shape of an ore body.

Another object of this invention is to determine the areal extent of a seismic wave shadow of an ore body.

Another object of this invention is to determine the volume limits of an ore body.

Another object of this invention is to provide a novel geophysical method for locating high velocity ore bodies which exist in a low velocity country rock.

This invention possesses many other advantages, and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Fig. 3 is a fragmentary sectional view of a region to be explored, and further illustrating the mode of use of the invention; and Figs. 4 and 5 are fragmentary views of the records obtained in the process of exploration.

Figures 1, 2:
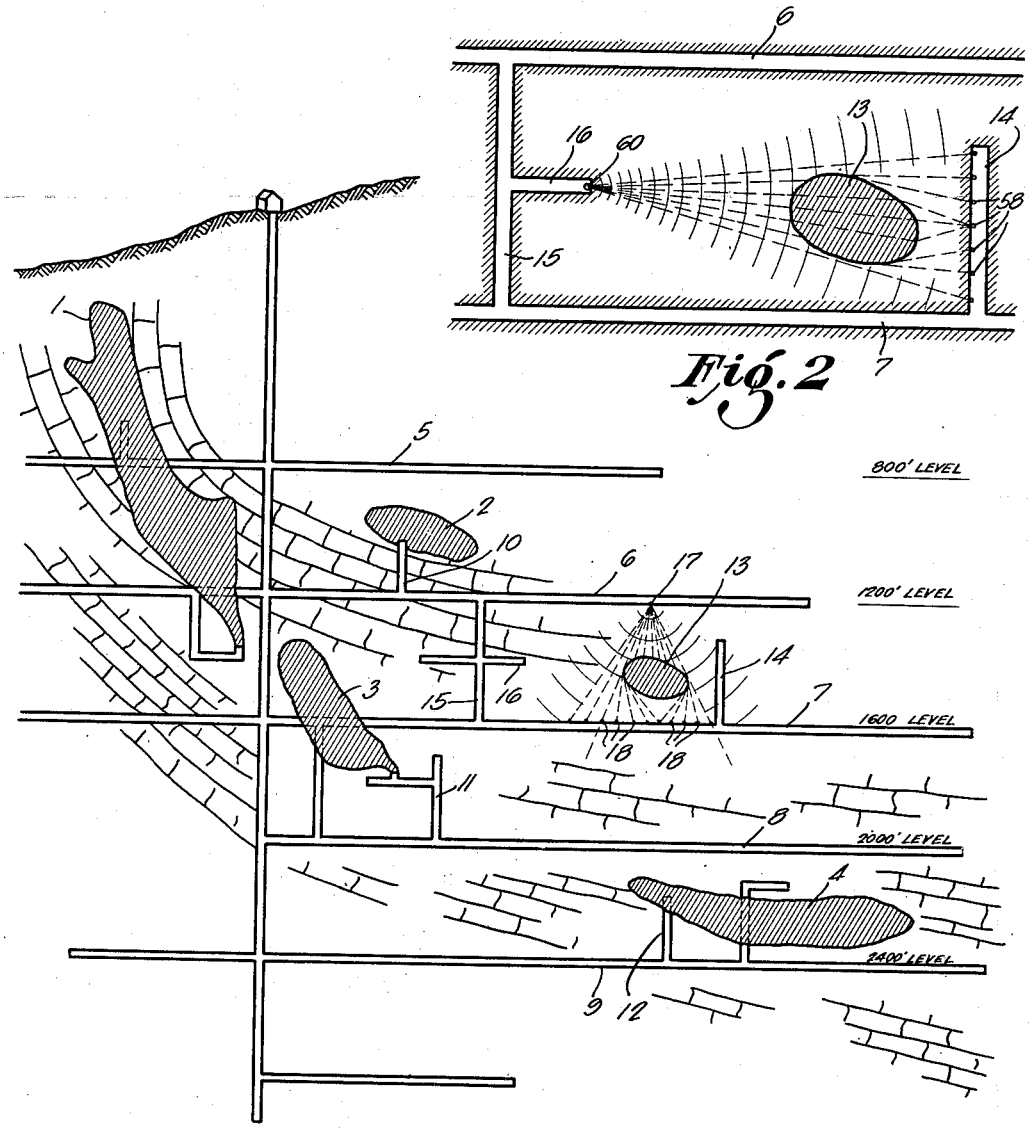
Figure 1 is a diagrammatic vertical section of a mine, indicating the manner in which the invention may be utilized.
Fig. 2 is an enlarged fragmentary view of a portion of the subterranean region illustrated in Fig. 1, and further illustrating the manner of use of the invention.

A typical vertical layout of mine workings is illustrated in Figure 1. Therein are shown a number of ore bodies 1, 2, 3 and 4 which have been or are being worked from various levels and drifts, illustrated for example by the levels 5, 6, 7, 8 and 9 and the drifts or raises such as 10, 11, 12 and 15.

These relatively large bodies of ore, occurring in the region being mined, may be considered as having been located either accidentally or by laborious exploratory excavations. Another ore body 13 (Figs. 1 and 2) is illustrated as an example of an ore body which has been unrecognized and unknown. This ore body is shown as located between levels 6 and 7, and as between the raises 14 and 15. An exploratory drift 16 is illustrated, directed generally toward the undiscovered ore body 13.

The ore body is shown as located in a region or province having a generally rocky characteristic. Such ore bodies have wave transmitting characteristics that are anomalous to the characteristics of the surrounding rock. Often such ore bodies have a materially different density than the surrounding rock; and the ore body may also be different both in lithological and structural features than the surrounding rock.

In such instances it is known that greater resistance is offered to the passage of seismic or elastic waves, often utilized for geophysical exploration.

If on the other hand the ore body 13 is a compact rocklike body having a higher elasticity than the surrounding medium, the velocity of the waves passing through the body is greater, and the intensity of the impulses caused by the waves at receptors is also greater; and again anomalous characteristics of the transmitted wave fronts would occur.

Advantage is taken of these phenomena by generating elastic or seismic waves and causing the wave front to pass through the region being explored, and to affect a plurality of receptors. Thus for example at the point 17 of Fig. 1, located in level 6, a wave front may be propagated by the detonation of an explosive charge. This charge of course is placed in proper energy transfer relation to the formation. At a lower level 7 a plurality of receptors, indicated in general by the reference character 18 may be arranged in order to record the impulses set up by the transmitted wave front, as the wave front arrives at the receptors. If the ore body 13 resists the passage of the waves more than the surrounding region, the first arrival at some of the receptor stations is retarded beyond the time of arrival had there been no ore body 13 interposed in the path of the waves.

By the aid of Figs. 3, 4 and 5 the particular manner in which these effects are utilized may be explained. The shot is detonated in this instant at point 19, available from level 20. In the lower level 21 may be placed a number of receptors 22 to 27 inclusive, comprising group A. The anomalous ore body 33 is shown as located in the region under exploration.

When the charge 19 is detonated (assuming that the ore body 33 transmits elastic waves at a lower rate than the surrounding medium), the time interval between the instant of detonation and the first arrival of the wave front at the receptors 22 to 27 will show anomalies or irregularities. These anomalies or irregularities would define a "shadow" effect caused by the interposition of the ore body 33 in the path of the traveling wave front.

We may assume first of all that the six receptors 22 to 27 inclusive are connected to an appropriate amplifier and camera recorder 34. We may also assume that by the aid of appropriate electrical connections 35 to the charge 19, the instant of the detonation is determined and recorded. The record for this position is indicated by the record A of Fig. 4.

It is convenient that the apparatus described herein be designed to time the wave arrivals to one ten thousandth of a second. The recording film speed must be at least 35 inches per second to allow for clear and distinct timing impressions on the film. The recording system should preferably be sensitive to seismic and sound wave frequencies of at least 250 to 300 cycles per second. Such frequencies provide sharply defined impulses on the record.

The record strip 36 may be divided for this purpose into longitudinal units, each corresponding for example to .005 second of time. By interpolation the times of arrival may be readily measured down to one ten thousandth of a second. The record strip 36 upon which the record is made is assumed to move in the apparatus 34, in the direction of the arrow 37. The instant of the detonation is indicated by the impulses 38 on the timer trace 39. The impulses corresponding to the arrival of the wave fronts at the receptors 22 to 27 inclusive are indicated by the graphs 40, 41, 42, 43, 44 and 45 respectively.

It is to be noted particularly that while the graphs corresponding to impulses 40, 41 and 42 are quite consistent and correspond to the reception of impulses at the receptor 22, 23 and 24, the impulses received in the shadow zone by the receptors 25, 26 and 27 show an abrupt departure from that regularity. Not only are the intensity of the impulses less but they are less sharply defined. Also, it is seen that the impulses of first arrivals at receptors 22, 23, 24 show times of arrival are uniformly graduated and correspond to the expected times of arrival of the wave front, and these graphs indicate abrupt and well-defined impulses. The impulses 43, 44 and 45, at receptors 25, 26 and 27 show irregularities in the times of arrival, nor are the impulses so abrupt or well defined. Instead of a sooner arrival for example at receptor 26 (corresponding to graph 43), the time of arrival is not consistent with the preceding graphs. There is an abrupt or sudden change in the character of the impulses 43, 44 and 45 as compared with that of impulses 40, 41 and 42. The impulses 43, 44 and 45 correspond to the shortest time path in or through or around the body 33.

The reason for this shadow effect is due to the alteration of the wave front characteristic as it passes through the ore body 33. The wave front approaches the ore body 33 as a convex surface. The approach of the wave front is illustrated progressively by the arcuate lines 46, 47 and 48. Within the body 33 the wave fronts are retarded, and a concave form of the wave front is obtained as illustrated by the arcuate lines 49, 50 and 51. Furthermore, since it has been assumed that the ore body 33 retards the waves the times of first arrival at the receptors 25, 26 and 27 are retarded. The difference in the character of the recorded impulses 43, 44 and 45, as compared with the character of the impulses 40, 41 and 42 is an indication of this shadow effect. The lack of abruptness of the impulses 43, 44 and 45 is probably due to the fact that the wave may also reach these receptors by progressing around the body 33, instead of through it; and this serves to confuse the record of the received impulses.

In order to check these observations further, and to obtain a better idea of the approximate size and location of the ore body 33, the receptors 22 to 26 may be shifted to the right for a subsequent detonation and record. Thus for this subsequent record the positions of the receptors (designated by group B) have been shifted to those indicated by the reference characters 27 to 32. The position 27 is the same as the last of the first series A, so as to obtain an overlapping between groups A and B.

Now if a new charge 19 is detonated with the position of the receptors represented by the group B, the resultant record will be as shown in Fig. 5. Here the timer trace 39 carries, as before, the timing impulse 38. The recorded impulse 52 corresponds to the recorded impulse 45, for both of them correspond to the receptor position 27. The succeeding impulses 53, 54, 55, 56 and 57 corresponding to the positions 28 to 32 inclusive show that these positions are outside of the "shadow zone" as they are quite regular. They show a marked or abrupt difference with the recorded impulses 52.

Accordingly, knowing the physical dimensions of the receptor locations 22 to 32 as well as the location of the source of the waves 19, it is readily deducible that the ore body 32 extends above the locations 25, 26 and 27.

It may be noted that the shadow effect is most easily recognizable when the ore body 33 is much closer to the line of receptors than if it were closer to the source 19. The wave fronts proceeding from the source 19 are then more capable of producing the anomalous records illustrated in Figs. 4 and 5. When the ore body 33 occupies a considerable portion of the entire angle subtended by the extreme receptor locations 22 to 27 or the receptor locations 27 to 32, the shadow effect is more pronounced. An optimum effect is obtained when the spacing between the receptor stations is quite small as compared to the least dimension of the section of body 33 intersected by a plane normal to a line 61 joining the source 19 and the central region of the ore body 33. Thus the spacing of the receptors as shown in Fig. 3 is less than half of the length of body 33 measured or generally normal to that plane which includes the shot point 19 and the receptors 21—27, 27—32. In general, if the distance between source 19 to the receptors is of several hundred feet (which would be usual), the spacing of the receptors should not be greater than about 20 feet. And in addition, the dimension in plane 59 should be of the same order as the distance between the ore body and the line of receptors; under any circumstances, this ratio of the distance between the body and the receptors to the dimension in plane 59 should be less than three.

In order to obtain a more accurate location of the ore body 33 in a direction transverse to the general direction from source 19 to the receptors, the source and the receptors may be moved to entirely new positions. For example in Figs. 1 and 2 the ore body 13 located between the horizontal levels 6 and 7 may be subjected downwardly from the level 6 toward the receptors 18, but also by propagating wave fronts from a drift 16 in a general horizontal direction toward the group of receptors 58 from the shot location 60. In this way a fairly good approximation of the location and size of the ore body 13 may be obtained. Although the shot locations 19 and 60 are shown as directing wave fronts crossing at about 90 degrees in the center of the region under exploration, this angle may be varied with good results; for example, this angle may be between 40 and 140 degrees.

Furthermore, by appropriate and accurate measurements of the times of arrival of the wave front at the receptors, the angular displacement of the front due to the intervening ore body 33 may be determined.

By the aid of this method ore bodies of considerable size that may have been overlooked in the ordinary progress of mining can be located.

What is claimed is:

1. The method of locating a body, such as an ore body, or the like in a predetermined region of limited boundaries and of substantially uniform seismic characteristics except for the presence of such bodies, which comprises the steps of generating seismic waves by a single disturbance at a selected generating point on one side of said generating region, receiving said seismic waves at a plurality of spaced reception points on the opposite side of said region, the reception points being so disposed that some of them may be located in the shadow of said body and others may be located outside the shadow of said body, making a record of the seismic waves received at each of said reception points on a multiple record sheet, the several records having time and shape characteristics, and determining from said records whether a body is present and the limits of such body.

2. The method of locating a body, such as an ore body, or the like in a predetermined region of limited boundaries and of substantially uniform seismic characteristics except for the presence of such bodies, which comprises the steps of generating seismic waves by a single disturbance at a selected generating point on one side of said generating region, receiving said seismic waves at a plurality of spaced reception points on the opposite side of said region, the reception points being so disposed that at least one of such points may be located in the shadow of said body and at least one other may be located outside the shadow of said body, making a record of the seismic waves received at each of said reception points on a multiple record sheet, the several records having time and shape characteristics, and determining from said records whether a body is present and the limits of such body.

3. The method of locating a body, such as an ore body, or the like in a predetermined region of limited boundaries and of substantially uniform seismic characteristics except for the presence of such bodies, which comprises the steps of generating seismic waves by a single disturbance at a selected generating point on one side of said generating region, receiving said seismic waves at a plurality of spaced reception points on the opposite side of said region, the reception points being so disposed that at least one of such points may be located in the shadow of said body and at least one other may be located outside the shadow of said body, the distance between adjacent reception points being not greater than approximately one tenth of the distance from the generating point to the reception points, making a record of the seismic waves received at each of said reception points on a multiple record sheet, the several records having time and shape characteristics, and determining from said records whether a body is present and the limits of such body.

4. The method of locating a body, such as an ore body, or the like in a predetermined region of limited boundaries and of substantially uniform seismic characteristics except for the presence of such bodies, which comprises the steps of generating seismic waves by a single disturbance at a selected generating point on one side of said generating region, receiving said seismic waves at a plurality of spaced reception points on the opposite side of said region, the reception points being so disposed that some of them may be located in the shadow of said body and others may be located outside the shadow of said body, the reception points jointly subtending a relatively large angle at the generating point and the distance between adjacent reception points being not greater than approximately one tenth the distance from the generating point to the reception points, making a record of the seismic waves received at each of said reception points on a multiple record sheet, the several records having time and shape characteristics, and determining from said records whether a body is present and the limits of such body.

5. The method of locating a body, such as an ore body, or the like in a predetermined region of limited boundaries and of substantially uniform seismic characteristics except for the presence of such bodies, which comprises the steps of generating seismic waves by a single disturbance at a selected generating point on one side of said generating region, receiving said seismic waves at a plurality of spaced reception points on the opposite side of said region, the reception points being so disposed that at least one of such points may be located in the shadow of said body and at least one other may be located outside the shadow of said body, said reception points jointly subtending a large solid angle at said generating point and the distance between adjacent reception points being not greater than one tenth the distance between the two sides of the region, making a record of the seismic waves received at each of said reception points on a multiple record sheet, the several records of the reception points within the shadow having time and shape characteristics contrasting with the records at the reception points outside the shadow, and determining from said records whether a body is present and the limits of such body.

6. The method of locating a body, such as an ore body, or the like in a predetermined region of limited boundaries and of substantially uniform seismic characteristics except for the presence of such bodies, which comprises the steps of generating seismic waves by a single disturbance at a selected generating point on one side of said generating region, receiving said seismic waves at a plurality of spaced reception points on the opposite side of said region, the reception points being so disposed that some of them may be located in the shadow of said body and others may be located outside the shadow of said body, making a record of the seismic waves received at each of said reception points on a multiple record sheet, the several records of the reception points within the shadow having time and shape characteristics contrasting with the reception points outside the shadow, repeating the above-mentioned steps with a new set of reception points having at least one in common with the first set, and determining from said records whether a body is present and the limits of such body.

7. The method of locating a body, such as an ore body, or the like in a predetermined region of limited boundaries and of substantially uniform seismic characteristics except for the presence of such bodies, which comprises the steps of generating seismic waves by a single disturbance at a selected generating point on one side of said generating region, receiving said seismic waves at a plurality of spaced reception points on the opposite side of said region, the reception points being so disposed that at least one of such points may be located in the shadow of said body and at least one other may be located outside the shadow of said body, making a record of the seismic waves received at each of said reception points on a multiple record sheet, the several records having time and shape characteristics, and determining from said records whether a body is present and the limits of such body, and repeating the process with another pair of opposing sides of said region.

HENRY HART PRATLEY.